June 19, 1962     E. K. KAPRELIAN ETAL     3,039,711

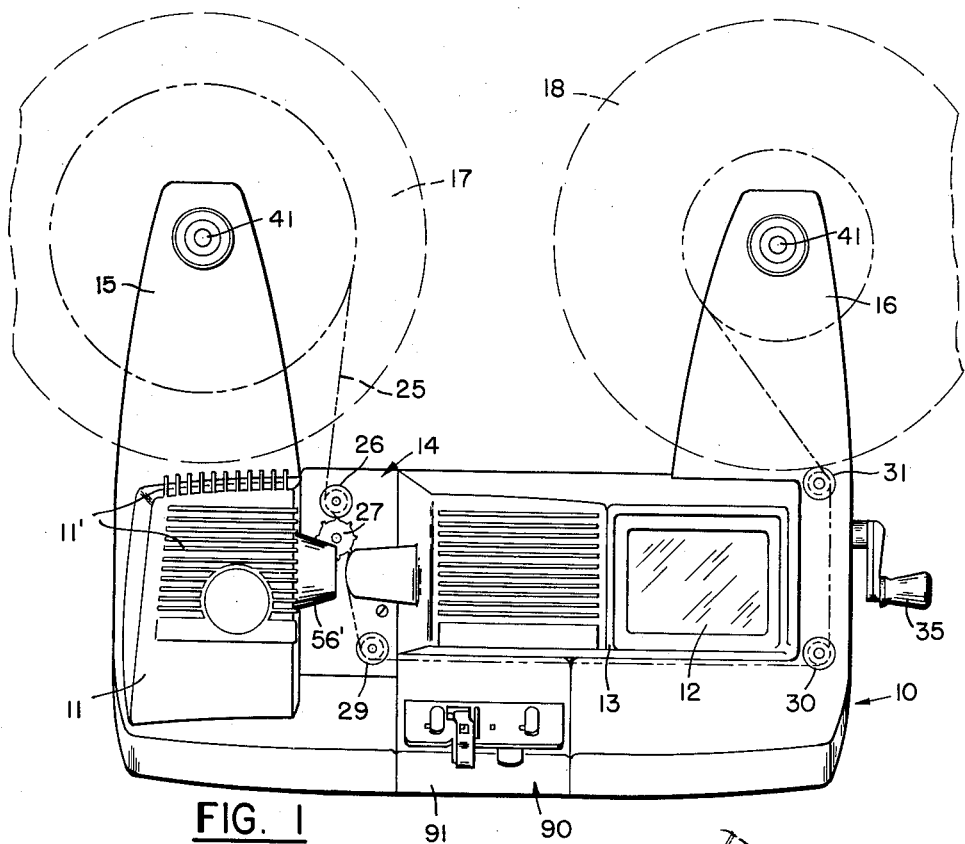
FIG. 1
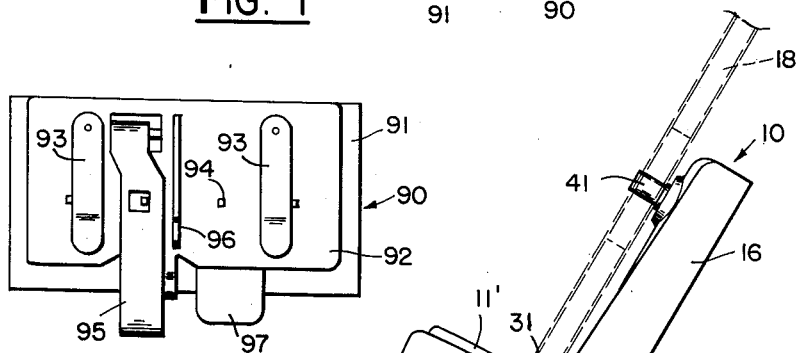
FIG. 8        FIG. 2
INVENTORS
EDWARD K. KAPRELIAN
BY WILLIAM CASTEDELLO
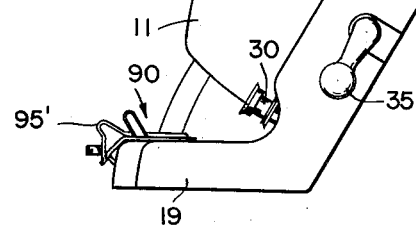
ATTORNEY

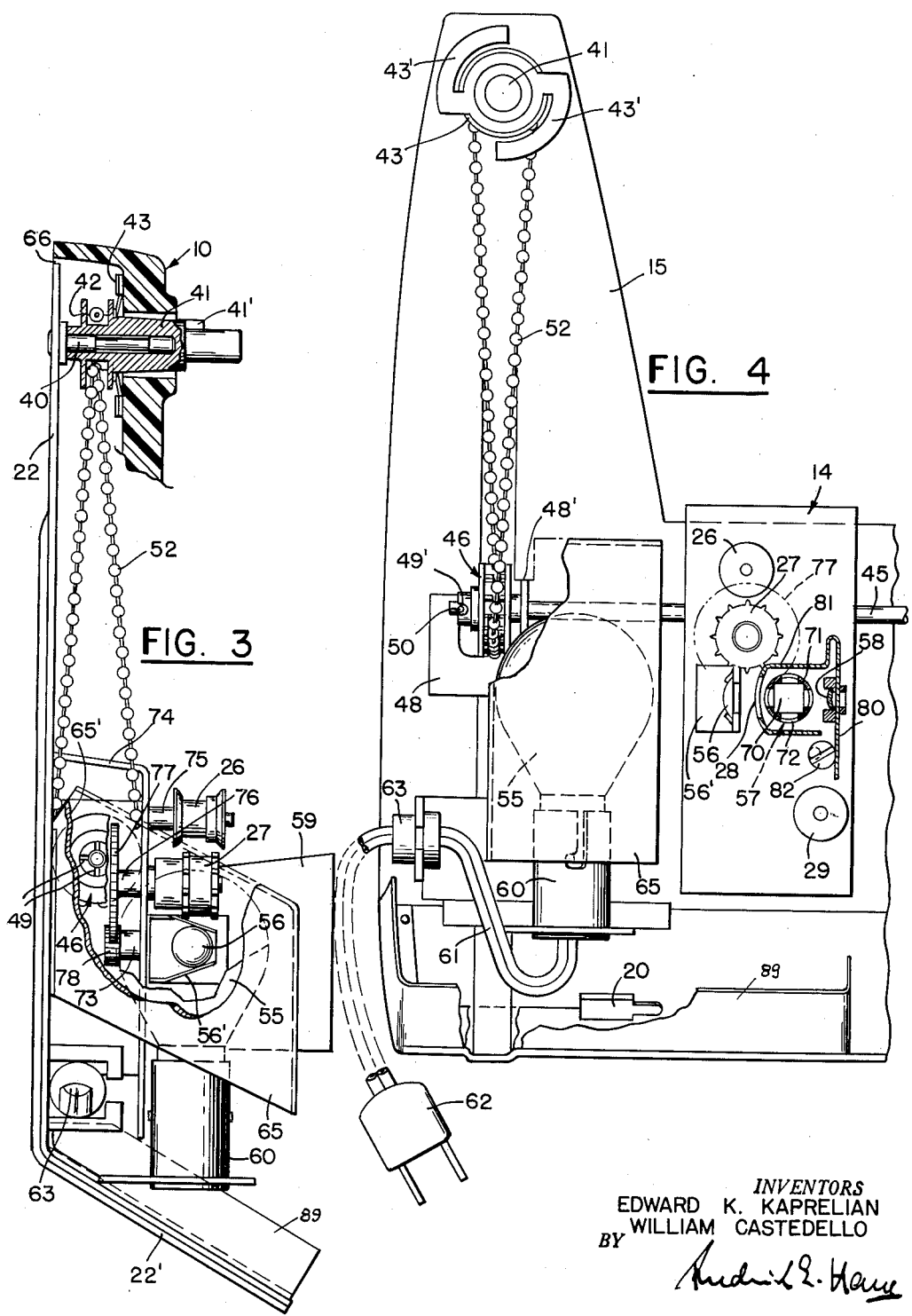

FILM VIEWING AND EDITING DEVICE

Filed Dec. 15, 1954     3 Sheets-Sheet 3

*INVENTORS*
EDWARD K. KAPRELIAN
BY WILLIAM CASTEDELLO

*ATTORNEY*

United States Patent Office 3,039,711
Patented June 19, 1962

3,039,711
FILM VIEWING AND EDITING DEVICE
Edward K. Kaprelian and William Castedello, both of Plainville, Conn., assignors to The Kalart Company, Inc., Plainville, Conn.
Filed Dec. 15, 1954, Ser. No. 475,496
7 Claims. (Cl. 242—55.12)

The present invention relates to viewing devices as are used to view and edit movie films, particularly to viewing devices used by amateurs but suitable for use by professionals also.

Viewing and editing devices of the general kind above referred to, serve to project frames of a movie film successively, one by one, upon an observation or viewing screen thereby permitting a review of the film, frame by frame, for instance for the purpose of eliminating less desirable frames and inserting appropriate titling. Such devices are usually equipped with a feed reel and a take-up reel for transporting the film to be viewed and edited through the device.

One of the objects of the present invention is to provide a novel and improved film viewing device which is very simple in design and inexpensive in manufacture, yet produces well defined and bright images of successive frames and permits convenient stopping of the film at each selected frame.

Another object of the invention is to provide a novel and improved film viewing device in which the optical system, the viewing screen, the winding and rewind means for the film and film splicer are all combined in a unitary structure and disposed in a common housing thereby attaining a simplified and streamlined design of the device.

Still another object of the invention is to provide a novel and improved film editing and viewing device employing a single operating handle which permits reversal of the traveling direction of the film without requiring a corresponding reversal in the direction of operation of the film winding means thereby greatly facilitating and simplifying winding of the film in either direction.

A further object of the invention is to provide a film viewing and editing device of the general type above referred to, equipped with novel and improved ventilating means which dissipate the heat generated by the light unit of the device so effectively that the housing of the device and the operating mechanism thereof are not unduly heated.

A still further object of the invention is to provide a novel and improved viewing device which can be conveniently and rapidly secured to a baseboard and detached therefrom, or fastened within a container or carrying case for transportation and storage.

Further objects, features and advantages of the invention will be pointed out hereinafter and set forth in the appended claims forming part of the application.

In the accompanying drawing a preferred embodiment of the invention is shown by way of illustration and not by way of limitation.

In the drawing:

FIG. 1 is a front view of the film viewing and editing device ready for operation.

FIG. 2 is a side view of FIG. 1.

FIG. 3 is a fragmentary sectional view of the device showing part of the operating mechanism thereof.

Figure 5:
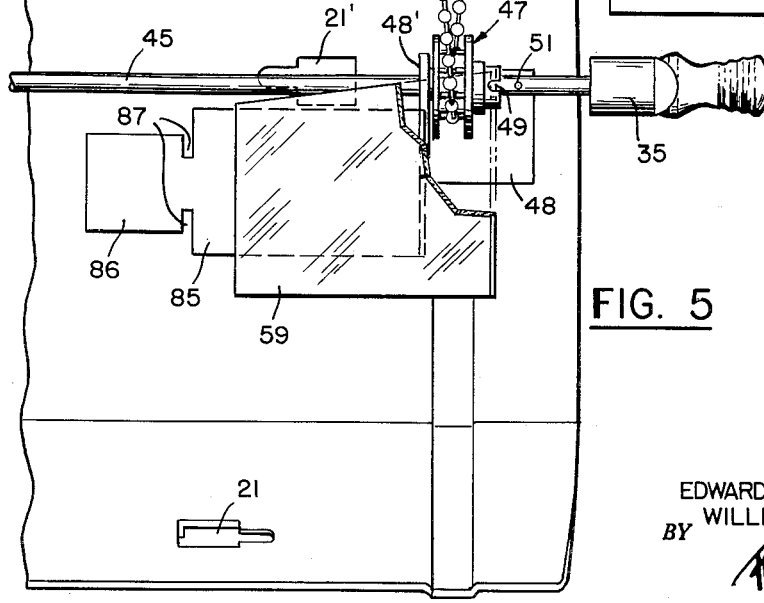

FIGS. 4 and 5, taken jointly, are a front view of the operating mechanism of the device as seen after removal of the front shell of the housing of the device.

Figure 6:
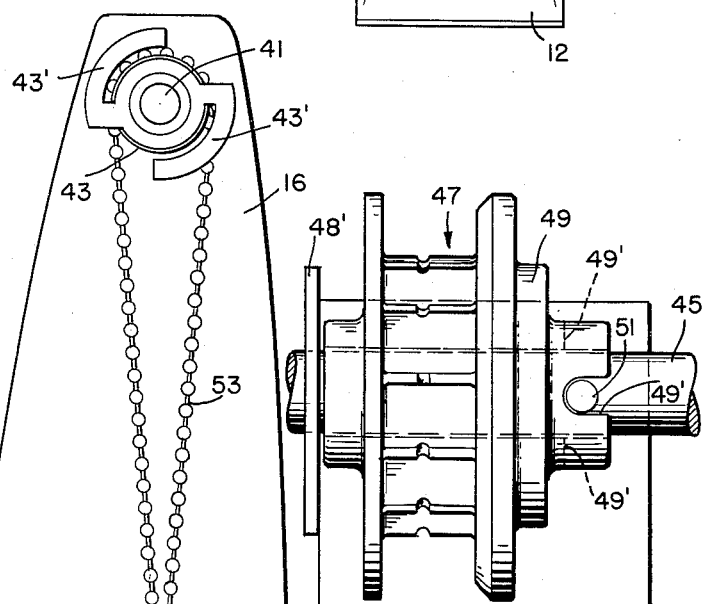

FIG. 6 is a detail view of part of the drive means for transporting the film through the device.

Figure 7:
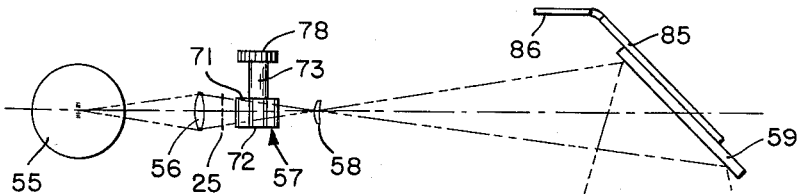

FIG. 7 is a diagrammatic view of the optical system of the device, and

FIG. 8 is a plan view of the splicer shown in FIGS. 1 and 2.

Referring first to FIGS. 1 and 2, the viewing and editing device as shown in these figures comprises a housing or shell 10 having left and right portions within which all the components of the device are disposed. The left hand side of the housing forms a well ventilated and cooled protuberance 11 which houses the light unit. This protuberance is formed with cooling fins and/or louvers 11'. The right side of the housing mounts the viewing screen 12 and is provided for this purpose with a corresponding ledged opening 13 in the front wall of the housing. The middle part of the housing is occupied by the optical system the components of which, with the exception of the mirror reflecting the image upon the viewing screen 12, are assembled in a unit 14. Standards or turrets 15 and 16 rise from the corners of the housing to provide the necessary space for reels 17 and 18, of which reel 18 constitutes the wind-up reel. The housing has an apron 19 forming a base which is horizontal in the operational position of the device shown in FIG. 2 to permit attachment of the device to a suitable baseboard. To facilitate attachment of the housing in operational position to a baseboard, key slots 20 and 21 are provided which are engageable by corresponding headed pins protruding from the baseboard.

The housing is accessible by means of a removable backplate 22 which serves to mount the principal components of the mechanism as will be more fully explained hereinafter. The backplate is bent off at 22' to cover the apron 19 of the housing and may also be provided with one or several key slots 21' to fasten the device within a carrying box for transportation and storage.

The housing or shell proper may be made of plastic and the backplate of sheet metal, or also of plastic.

Referring to the detailed figures:

Film Guide Means

The film 25 wound on feed reel 17 is guided under an idler 26, over and around a sprocket 27, past a gate 28 interposed in the optical system to be described later on, around guide rolls 29, 30 and 31 to the take-up reel 18. The reels may be rotated either in one direction for winding the film upon reel 18 or in the opposite direction for winding film upon reel 17 by rotating a handle 35 in one and the same direction as will be explained hereinafter.

Mounting Means for Reels

The mounting means for the two reels are similar. Each comprises a bearing stud 40 secured to backplate 22 and rotatably seating a spindle 41. The spindle end protrudes from the front wall of the housing and serves to receive the hub of the respective reel. To prevent rotation of the reels on the spindles, a key portion 41' is preferably provided. The spindle portion between backplate 22 and the front wall of the housing has a sprocket portion 42, either integral with the spindle or fixedly secured thereto. As is apparent, each reel together with its spindle 41 can be freely rotated on the respective stud 40. To prevent a limited continued rotation of the feed reel due to inertia when the take-up reel is stopped— such rotation would result in an undesirable looping of the film—suitable brake means such as a friction brake are preferably provided for each spindle. These brake means are shown as a springy friction washer 43 disposed between sprocket portion 42 and the front wall of the housing. The spring washer has slightly bent off arms 43' which effect a rapid stopping of the respective reel when the film no longer pulls the reel.

Drive Means for Driving the Reel Spindles in a Selected Direction

The drive means comprise a rotary drive shaft 45 rotatably and axially slidably extended through two driving members in form of sprockets 46 and 47. These sprockets and the shaft are suitably supported by the back plate 22 for instance by brackets 48 having upturned bearing portions 48'. The end of the drive shaft protruding from the right hand wall of the housing or shell 10 supports handle 35 which is seated to permit a limited axial displacement of the drive shaft. As can best be seen in FIG. 6, each sprocket has a collar or flange 49 formed with one or several circumferentially spaced slots 49'. The flanges 49 and the slots 49' of the sprockets face in opposite direction as can be clearly seen in FIG. 4 or 5. Each slot 49' of sprocket 46 coacts with a pin 50 radially extending from the drive shaft and each slot 49' of sprocket 47 coacts with a pin 51 radially extending from the drive shaft. In actual practice it is advantageous to provide several pairs of diametrically opposite coacting pins so that a pair of pins will engage a pair of slots after a fractional revolution of the drive shaft relative to the sprockets.

Sprocket 46 is coupled with the reel spindle on standard 15 by a bead chain 52 and similarly, sprocket 47 is coupled with the reel spindle on standard 16 by a bead chain 53. As is evident, the transmisison means between the drive shaft and the spindles, shown as being formed by the sprockets and the bead chains, may be replaced by other transmission means known and suitable for the purpose to rotate the spindles by rotation of the drive shaft. Toothed or perforated fabric belts or fabric-riveted belts may be advantageously employed as such belts are practically silent in operation.

The spacing of pins 50 and 51 is such that when pins 50 engage their slots, pins 51 will be disengaged from the respective slots and visa versa.

The function of the drive means as hereinbefore described, is as follows:

Let it be assumed that the axial position of shaft 45 is such that pins 50 engage the slots 49' of sprocket 46 (see FIG. 4) and that handle 35 is rotated in clockwise direction as seen looking upon the right hand side wall of the device, then the spindle 41 of reel 17 is rotated in counter-clockwise direction. The sprocket 47 coupled to the spindle of reel 18 is idling on shaft 45, pins 51 being disengaged from slots 49' of sprocket 47, but reel 18 will rotate in counter-clockwise direction by the pull of the film. Rotation of reel 17 by the drive means constitutes the rewind operation, reel 17 being shown as the feed reel. When it is now desired to change from rewinding film upon reel 17 to winding film upon take-up reel 18, shaft 45 is pushed slightly towards the left so that pins 50 leave the respective slots 49' and pins 51 engage the respective slots 49', and the rotation of the handle is continued in the same direction. As a result, reel 18 is driven in clockwise direction and reel 17 is idling on shaft 45 but rotated in clockwise direction by the pull of the film.

The action of the friction washers 43 prevents overrunning by the idling reel when the driven reel is stopped so that the film will not form an undesirable loop.

The aforedescribed reversible drive means permit to reverse readily and conveniently the direction of movement of the film without reversing the rotation of handle 35 which is inconvenient in practice. If due to an error the operator should reverse the rotation of the handle, he becomes immediately aware of his mistake as this results in looping of the film on the respective driven reel.

Optical System of the Viewing Device

As shown in FIG. 7, the optical system comprises a light unit 55 such as an incandescent lamp of suitable candle power the light of which is beamed through a condenser lens 56, film 25, shutter 57 and projection lens 58 onto a mirror 59 which reflects the image upon viewing screen 12.

Lamp 55 is shown as being fitted in a bayonet type socket 60 of conventional design which is disposed within protuberance 11 of the housing. The terminals of the socket are connected to a connecting cord 61 ending in a plug 62. The connecting cord is passed through the left hand side wall of the housing and restrained therein by any suitable means such as a grommet 63.

To prevent stray light from reaching the mirror and other components of the optical system and to dissipate the rather considerable heat generated by lamp 55, a shield or hood 65 is provided. This shield is open at the bottom and also open at its top edge 65' facing backplate 22. The upper edge of the backplate ends short of the top wall of housing 10 so that a transverse vent slot 66 is formed, preferably extending across the width of standard 15. As a result, the heat generated by the lamp within the space defined by shield 65 is rapidly discharged from this space and from the housing by the chimney effect produced by the open bottom of the shield and slots 65' and 60 which causes the heat to rise along backplate 22. Due to this rapid dissipation of the heat the entire housing remains reasonably cool which has the advantage of eliminating any danger to the operator and the film. To prevent any leakage of light through the gap which sometimes remains between the left side of housing or shell 10 and part 22' of back plate 22 when the assembly is completed, a second shield 89 is provided. This shield may be made of strip metal riveted or otherwise suitably secured to backplate part 22'.

Condenser lens 56 is suitably mounted by means of a bracket 56'.

Shutter 57 comprises a square prism 70 disposed within an opaque cylinder 71 provided with four axial slots 72 each facing one of the four square sides of the prism. This sleeve constitutes in effect the obturator of the shutter. Prism 70 and its sleeve 71 are fixedly seated on a shaft 73 which is rotatably mounted in a bracket 74 secured to backplate 22. Bracket 74 further supports idler 26 which is rotatably mounted by means of a shaft 75 and sprocket 27 which is rotatably mounted in bracket 74 by means of a shaft 76. Shaft 76 seats a gear 77 in mesh with a gear 78 seated on shaft 73 of prism 70 and sleeve 71. Accordingly, the rotation of sprocket 27 effected and controlled as to speed by the speed of a film pulled through the device, is transmitted to the prism and obturator sleeve assembly. The ratio of transmission from the sprocket to the prism and its sleeve is selected in a well understood manner so as to produce standing images of successive frames of the film on screen 12.

Projection lens 58 is suitably mounted in a springy arm 80 forming part of a generally U-shaped member 81, the front wall of which has an opening forming gate 28 and also serving to guide the film as can best be seen in FIG. 1. Springy arm 80 coacts with an eccentric screw 82, rotation of which effects a corresponding slight bending of arm 80 for purpose of focussing lens 58.

Mirror 59 is attached to a bracket 85 the base 86 of which is secured to backplate 22, or another suitable part of the housing. Bracket 85 forms an appropriate angle with base 86 which can be conveniently adjusted by bending bracket 85 so that the reflected image is centered upon viewing screen 12. To facilitate adjustment of bracket 85, the junction between the bracket and the base is preferably slotted at 87.

Film Splicer

The film editing and viewing device further comprises as an integral component a film splicer generally designated by 90. The splicer comprises a base 91 preferably made of plastic which hugs the apron portion 19 of housing or shell 10. On this base is mounted a main plate 92 to which are suitably fastened for instance, by rivets two spring clips 93. These clips serve to hold the film to be spliced against the plate 92 in registry with guide pins 94. The splicer further includes a hinged slidable spacer lever 95 with a springy front portion 95' for yieldably retaining the spacer lever in its lower position shown in FIG. 2, a cutter blade 96, and a removable film scraper 97.

The splicer is operated in a conventional manner well understood in the art. As is apparent, the attachment of the splicer to the front wall of housing or shell 19 permits a convenient splicing of the film at frames selected by observing successive frames of the film on viewing screen 12.

*Operation of the Device*

Let it be assumed that the device is suitably attached to a base plate by means of bottom slots 20 and 21 and that the film is threaded through the respective components of the device as can best be seen in FIG. 1.

When it is desired to wind the film upon reel 18, shaft 45 is pushed by means of handle 35 into an axial position in which reel 18 is driven. According to FIG. 5, shaft 45 is pushed toward the left so that pins 51 engage slots 49' of driving member 47. Handle 35 is now rotated to pull the film through the device. To reverse the movement of the film, that is, to wind the film upon reel 17, the operator simply pulls shaft 45 toward the right whereby pins 51 become disengaged and pins 50 become engaged with slots 49 of driving member 46 and continues the rotation of handle 35 in the same direction. In the event the operator should erroneously reverse the rotation of handle 35, such error manifests itself immediately by a film loop formed at the driven reel. To correct the error, the operator simply resumes rotation of the handle in the correct direction thereby taking up the slack without damage to the film or any part of the device.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. An editor for viewing and editing movie film, comprising a housing, a pair of rotary spindles for two reels of film, and reversible drive means coacting with the spindles for rotating the same, the said drive means including a drive shaft mounted axially displaceable and rotatable within the housing protruding from one side wall thereof, two driving members rotatably seated on said shaft, transmission means coupling each of said driving members with a respective one of said spindles, said transmission means effecting rotation of the spindles in opposite direction upon rotation of the driving members in the same direction. a releasable coupling means disposed between each driving member and the drive shaft for rotating a coupled driving member in unison with the shaft, said coupling means being selectively operable for the purpose aforesaid by axial displacement of the shaft in either direction, and a handle mounted on said protruding shaft end for manually and selectively effecting axial displacement of the shaft in either direction and unidirectional rotation of the shaft.

2. An editor according to claim 1, wherein each of said coupling means comprises an engaging coupling element and a receiving coupling element on the drive shaft and the driving member respectively, the coupling elements of one of said coupling means engaging each other upon axial displacement of the drive shaft in one direction and the coupling elements of the other coupling means upon axial displacement of the drive shaft in opposite direction.

3. An editor according to claim 2, wherein each of said driving members includes a slotted portion and said drive shaft mounts pins for coaction with the slotted portion of each driving member, said slotted portions and pins constituting said coupling elements, the slotted portions of the two driving members facing in opposite direction for coupling engagement with the respective pins upon axial displacement of the drive shaft in opposite direction.

4. A device for viewing and editing movie film, comprising a housing having two hollow standards rising therefrom, a pair of rotary supports for two reels of film, each support being mounted in one of said standards, reversible drive means coacting with said supports for rotating the same, said drive means including a rotatable and axially displaceable drive shaft disposed within said housing, one end of said shaft protruding from a side wall of the housing, two driving members rotatably seated on said shaft, transmission means coupling each of said driving members with a respective one of said supports, said transmission means effecting rotation of the supports in opposite direction upon rotation of the driving members in the same direction, a releasable coupling means disposed between each driving member and the drive shaft for rotating a coupled driving member in unison with the shaft, said coupling means being selectively operable for the purpose aforesaid by axial displacement of the shaft in either direction, and a handle mounted on said protruding shaft end for manually and selectively effecting axial displacement of the shaft in either direction and unidirectional rotation of the shaft.

5. A device according to claim 4, wherein each of said support means comprises a bearing stud fixedly secured to a wall portion of the respective standard, a spindle for receiving the hub of a reel rotatably seated on said stud, and brake means for arresting rotation of the spindle by the force of inertia.

6. A device according to claim 5, wherein the said brake means comprise a springy friction washer disposed between the spindle and a wall portion of the respective standard.

7. A device for viewing and editing movie film, comprising a housing; wind and rewind means including a pair of rotary supports for two reels of film mounted in said housing, reversible drive means coacting with said supports for rotating the same, said drive means including a rotatable drive shaft disposed axially displaceable within said housing, two driving members rotatably seated on said shaft, transmission means coupling each of said driving members with a respective one of said supports, said transmission means effecting rotation of the supports in opposite direction upon rotation of the driving members in the same direction, and a releasable coupling means disposed between each driving member and the drive shaft for rotating a coupled driving member in unison with the shaft, said coupling means being selectively operable for the purpose aforesaid by axial displacement of said shaft in either direction.

References Cited in the file of this patent

UNITED STATES PATENTS

| | | |
|---|---|---|
| 1,210,955 | Langheck | Jan. 2, 1917 |
| 1,527,548 | Hall | Feb. 24, 1925 |
| 1,676,261 | Grassey | July 10, 1928 |
| 1,745,718 | Sargent | Feb. 4, 1930 |
| 2,207,075 | Sperry | July 9, 1940 |
| 2,231,384 | Goldberg | Feb. 11, 1941 |
| 2,268,450 | Haggett | Dec. 30, 1941 |
| 2,278,781 | Harrison | Apr. 7, 1942 |
| 2,297,222 | Kemna | Sept. 29, 1942 |
| 2,343,850 | Fairbanks et al. | Mar. 7, 1944 |
| 2,583,467 | Burleigh et al. | Jan. 22, 1952 |